US007895448B1

(12) United States Patent
Satish (10) Patent No.: US 7,895,448 B1
(45) Date of Patent: Feb. 22, 2011

(54) RISK PROFILING

(75) Inventor: Sourabh Satish, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 962 days.

(21) Appl. No.: 10/782,396

(22) Filed: Feb. 18, 2004

(51) Int. Cl.
*G06F 11/30* (2006.01)

(52) U.S. Cl. .................... 713/188; 713/187; 726/24; 726/25; 726/26

(58) Field of Classification Search ............... 713/193, 713/189, 188, 187, 24, 25, 26; 726/22, 25, 726/24, 26, 187, 188
See application file for complete search history.

(56) References Cited

U.S. PATENT DOCUMENTS

| 5,278,901 | A  | * | 1/1994  | Shieh et al. .................. 726/22 |
| 6,357,008 | B1 | * | 3/2002  | Nachenberg .................. 726/24 |
| 6,405,318 | B1 | * | 6/2002  | Rowland ...................... 726/22 |
| 6,711,615 | B2 | * | 3/2004  | Porras et al. ................. 709/224 |
| 6,757,685 | B2 | * | 6/2004  | Raffaele et al. .............. 707/10 |
| 7,003,561 | B1 | * | 2/2006  | Magdych et al. ............ 709/223 |
| 7,017,186 | B2 | * | 3/2006  | Day ............................. 726/23 |
| 7,028,338 | B1 | * | 4/2006  | Norris et al. ................. 726/23 |
| 7,043,757 | B2 | * | 5/2006  | Hoefelmeyer et al. ......... 726/24 |
| 7,058,978 | B2 | * | 6/2006  | Feuerstein et al. ............ 726/26 |
| 7,065,789 | B1 | * | 6/2006  | Neyman et al. ............... 726/24 |
| 7,073,198 | B1 | * | 7/2006  | Flowers et al. ................ 726/25 |
| 7,076,802 | B2 | * | 7/2006  | Poisner ........................ 726/22 |
| 7,079,028 | B2 | * | 7/2006  | Herrmann et al. ........... 340/541 |
| 7,093,288 | B1 | * | 8/2006  | Hydrie et al. ................. 726/13 |
| 7,096,503 | B1 | * | 8/2006  | Magdych et al. ............. 726/25 |
| 7,117,531 | B2 | * | 10/2006 | Fukasawa ..................... 726/22 |
| 7,120,934 | B2 | * | 10/2006 | Ishikawa ...................... 726/23 |
| 7,124,438 | B2 | * | 10/2006 | Judge et al. ................... 726/22 |
| 7,134,142 | B2 | * | 11/2006 | Smith .......................... 726/24 |
| 7,134,143 | B2 | * | 11/2006 | Stellenberg et al. ........... 726/25 |
| 7,143,442 | B2 | * | 11/2006 | Scarfe et al. .................. 726/23 |
| 7,146,305 | B2 | * | 12/2006 | van der Made ............... 703/22 |
| 7,155,741 | B2 | * | 12/2006 | Sobel et al. ................... 726/22 |
| 7,155,742 | B1 | * | 12/2006 | Szor ............................. 726/25 |
| 7,158,024 | B2 | * | 1/2007  | Chung et al. ................. 340/515 |
| 7,162,741 | B2 | * | 1/2007  | Eskin et al. ................... 726/25 |
| 7,162,742 | B1 | * | 1/2007  | Flowers et al. ................ 726/25 |
| 7,171,689 | B2 | * | 1/2007  | Beavers ....................... 726/22 |
| 7,174,566 | B2 | * | 2/2007  | Yadav .......................... 726/26 |
| 7,181,769 | B1 | * | 2/2007  | Keanini et al. ................ 726/23 |
| 7,185,368 | B2 | * | 2/2007  | Copeland, III ............... 726/25 |
| 7,210,040 | B2 | * | 4/2007  | Jordan ........................ 713/187 |

(Continued)

OTHER PUBLICATIONS

Ko et al., "Automated Detection of Vulnerabilities in Privileged Programs by Execution Monitoring", Proceedings of the 10th Annual Computer Security Applications Conference, Orlando, Florida, 1994 pp. 134-144.*

*Primary Examiner*—Matthew B Smithers
*Assistant Examiner*—Paul Callahan
(74) *Attorney, Agent, or Firm*—Hunton & Williams, LLP (57) ABSTRACT

A technique for providing computer security is provided. Providing computer security comprises providing an executable associated with a static state, determining whether the executable meets a predetermined criterion, and associating a risk level with the criterion if it is determined that the executable meets the predetermined criterion. Determining whether the executable meets a predetermined criterion does not compare the executable with a virus signature.

26 Claims, 5 Drawing Sheets

U.S. PATENT DOCUMENTS

| | | | |
|---|---|---|---|
| 2002/0083343 A1* | 6/2002 | Crosbie et al. | 713/201 |
| 2002/0188864 A1* | 12/2002 | Jackson | 713/201 |
| 2003/0065926 A1* | 4/2003 | Schultz et al. | 713/188 |
| 2003/0105976 A1* | 6/2003 | Copeland, III | 713/201 |
| 2003/0172291 A1* | 9/2003 | Judge et al. | 713/200 |
| 2003/0172294 A1* | 9/2003 | Judge | 713/200 |
| 2003/0188189 A1* | 10/2003 | Desai et al. | 713/201 |
| 2003/0212910 A1* | 11/2003 | Rowland et al. | 713/201 |
| 2004/0139353 A1* | 7/2004 | Forcade | 713/201 |
| 2004/0143749 A1* | 7/2004 | Tajalli et al. | 713/200 |
| 2005/0071813 A1* | 3/2005 | Reimer et al. | 717/125 |
| 2005/0108562 A1* | 5/2005 | Khazan et al. | 713/200 |
| 2007/0043957 A1* | 2/2007 | Benoit et al. | 713/193 |

* cited by examiner

| Subcategories | Criteria used to analyze executables | Risk value |
|---|---|---|
| Configuration | runs as a service | 1 |
| | runs under highly privileged account | 1 |
| | is not installed via a standard procedure | 2 |
| | has insufficient access control | 1 |
| | is recent | 1 |
| | is not signed | 1 |
| | modified date is not the same as created date | 1 |
| Capabilities | has networking capability | 2 |
| | has privilege manipulation capabilities | 1 |
| | has remote process capabilities | 1 |
| | can launch other processes | 1 |
| Misc. properties | has secure coding violations | 1 |

Figure 3

| Subcategories | Criteria used to analyze running processes | Risk value |
|---|---|---|
| Configuration | has higher effective privilege | 1 |
| | has more privileges than the process should have | 1 |
| | has loaded in extra dynamic libraries | 1 |
| Capabilities | owns system objects that do not have sufficient access control | 1 |
| | owns UDP port (sending) | 1.5 |
| | owns UDP port (listening) | 2 |
| | owns TCP port (sending) | 0.5 |
| | owns TCP port (listening) | 1 |

Figure 4

| Run-time analysis criteria | Risk value |
|---|---|
| launches child processes without complete path specification | 1 |
| launches child processes that inherit privileges | 1 |
| exhibits different attributes/behavior given different arguments | 1 |
| impersonates users | 1 |

Figure 5

RISK PROFILING

FIELD OF THE INVENTION

The present invention relates generally to computer security. More specifically, a risk profiling technique is disclosed.

BACKGROUND OF THE INVENTION

Security is an important issue in modern computer networks. Correctly identifying potential viruses and suspicious activities is an important aspect of host and network security. Some intrusion detection programs use signatures to identify viruses or attacks. However, such an approach is inadequate before the signatures become available. Some existing intrusion detection programs provide security protection by observing traffic patterns on the network to learn normal system behavior, and by detecting activities that have not occurred previously. Some advanced Host based security systems offer protection by detecting variations to normal system behavior. Such activities are generally deemed to be potential attacks and may be identified and/or prevented.

A typical intrusion detection program monitors system activities and learns about normal run-time behavior of the system after it is installed. Information about the normal activities of the system, such as which applications may open network connections, etc., is typically gathered by observing network traffic. The program usually spends a significant amount of time learning about the behaviors before it begins to offer protection. If a patch or system upgrade is applied, the program usually will relearn the dynamic, run-time behavior of the system. After the relearning phase is completed, the program starts to offer protection again.

While it is useful to provide security protection based on known system behavior using methods described above, several problems remain. Existing intrusion detection programs typically have long learning and relearning cycles and generally do not provide protection during these periods, thus leaving the system vulnerable to attack. Also, existing programs are typically implemented using large configuration lists to track system behavior and tend to be resource intensive. Furthermore, these existing programs usually do not offer sufficient insight into the risks to which the system is vulnerable. It would be desirable to have a way to offer intrusion detection and protection without requiring extensive learning periods. It would also be useful if such a technique could be efficiently implemented and would provide better risk information.

BRIEF SUMMARY OF THE INVENTION

A technique for providing computer security is disclosed. In some embodiments, it is determined whether an executable meets certain criteria. If it is determined that a criterion is met, a risk level is associated with the criterion. In some embodiments, a risk profile can be derived based on the determination. The risk profile indicates one or more risk properties associated with the executable in some embodiments; it may include a risk level, a risk type, etc. In some embodiments, it is also determined whether a process associated with the executable meets certain predetermined criteria and the results of the determination are used to update the risk profile. In some embodiments, the risk profile is updated based on historical evidence analysis of records such as logs, crash dump files, prefetch files, swap files, etc. Security protection is provided using the risk profile.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A technique for providing computer security is disclosed. In some embodiments, it is determined whether an executable meets certain criteria. If it is determined that a criterion is met, a risk level is associated with the criterion. In some embodiments, a risk profile can be derived based on the determination. The risk profile indicates one or more risk properties associated with the executable in some embodiments; it may include a risk level, a risk type, etc. In some embodiments, it is also determined whether a process associated with the executable meets certain predetermined criteria and the results of the determination are used to update the risk profile. In some embodiments, the risk profile is updated based on historical evidence analysis of records such as logs, crash dump files, prefetch files, swap files, etc. Security protection is provided using the risk profile.

Figure 1:
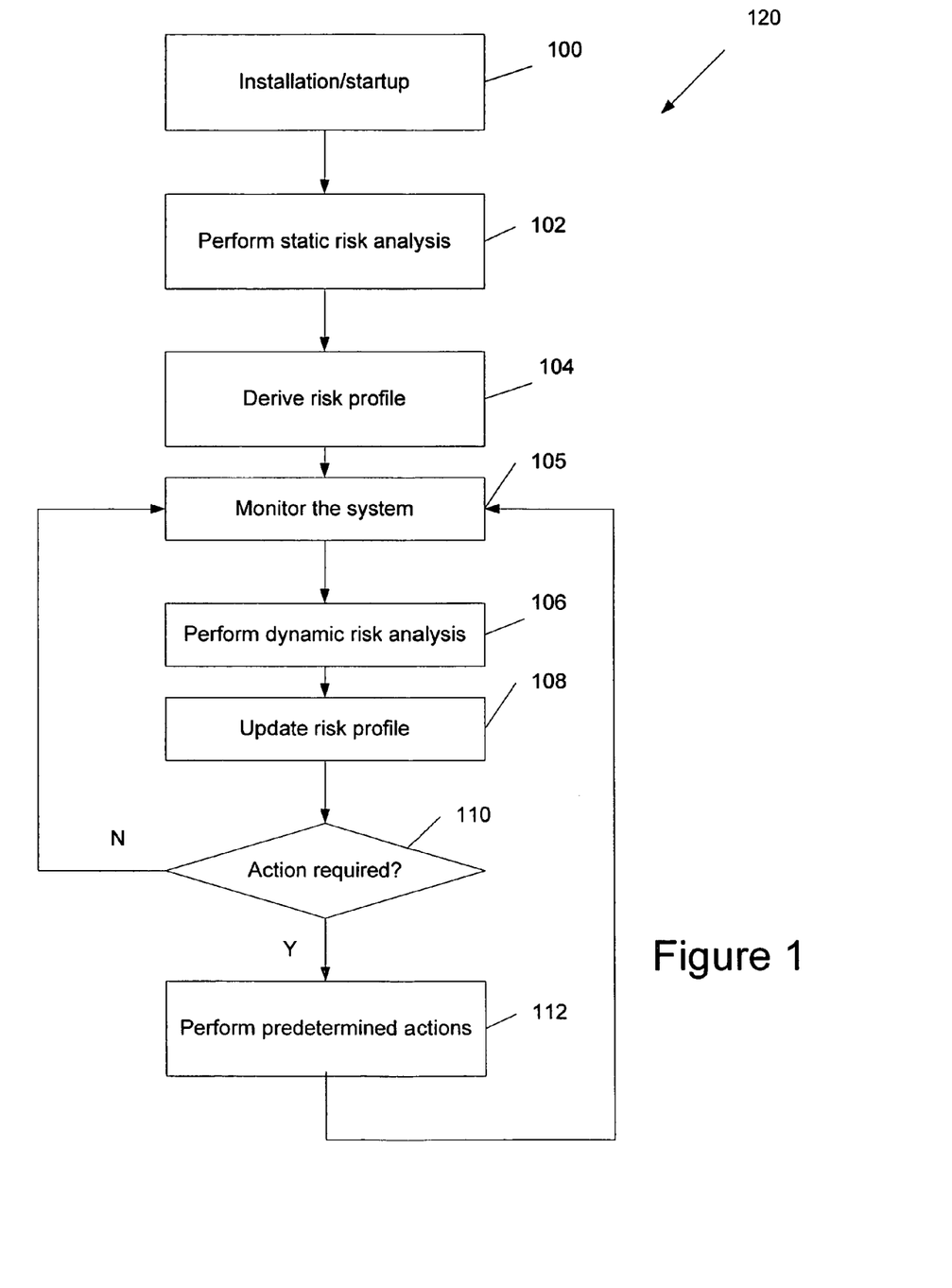
FIG. 1 is a flowchart illustrating a procedure for providing security protection according to some embodiments.

FIG. 1 is a flowchart illustrating a procedure of providing security protection according to some embodiments. In this example, an intrusion detection system (IDS) is configured to provide security protection according to procedure 120. For the purposes of illustration, an IDS providing computer security via is discussed throughout this specification, although other types of security systems may also be employed. As used herein, an IDS refers to a system configured to detect security issues. Some IDSs are also capable of preventing undesirable activities from occurring. An IDS may be implemented as software, hardware, firmware or combinations thereof. An IDS may be configured to monitor one or more devices on a network. An IDS may reside on the system under protection (hereinafter referred to as "the system") or on a separate device on the network.

After the IDS is installed or started up, or after the system is started up (100), a static risk analysis is performed (102). The static risk analysis analyzes the static states of the executables and optionally the static states of the processes currently running in the system, in order to determine the potential risk an executable will bring to the system when the executable is invoked to perform its designated operations. As used herein, executables (also referred to as binaries) refer to instruction sets used to carry out operations. Examples of executables include files that can be invoked and executed by the operating system, such as the portable executable (PE) files on the Windows operating system and executable and linking format (ELF) files on the Unix operating system. As used herein, an instance of an executable that is invoked or run by the operating system is referred to as a process. There may be multiple processes that correspond to the same executable. In some embodiments, the static risk analysis includes determining whether an executable in the system meets certain criterion. If an executable meets certain criterion, then a risk level is associated with the criterion.

The static risk analysis does not require the learning of the system behavior in an adaptive manner over time; a snapshot of the static states may be used to facilitate the analysis. In some embodiments, the static risk analysis also includes analyzing processes that are presently operating on the system in some embodiments. Risk profiles for the executables and/or processes are then derived based on the analysis (104). In some embodiments, the risk profile indicates how much risk an executable presents, and/or the type of risk to which the executable is vulnerable. In some embodiments, the static analysis does not include checking the executable against a virus signature. Details of the static risk analysis are discussed below.

In the example shown, after the initialization phase (100-104), the IDS begins to offer protection to the system by monitoring activities on the system (105). Optionally, dynamic risk analysis is performed in some embodiments (106). Based on observations of system activities over time while the processes are running in the system, the dynamic analysis provides further information about the potential risks. Details of the dynamic risk analysis are discussed below. The risk profiles are then updated according to the dynamic risk analysis results (108).

If it is determined that action is required because of, for example, potentially undesirable activities raising the risk level of an executable or a process associated with the executable (110), then certain predetermined action is performed (112). Otherwise, the IDS continues to monitor the system (105). After the action is performed, the IDS also continues to monitor the system (105).

Figure 2:
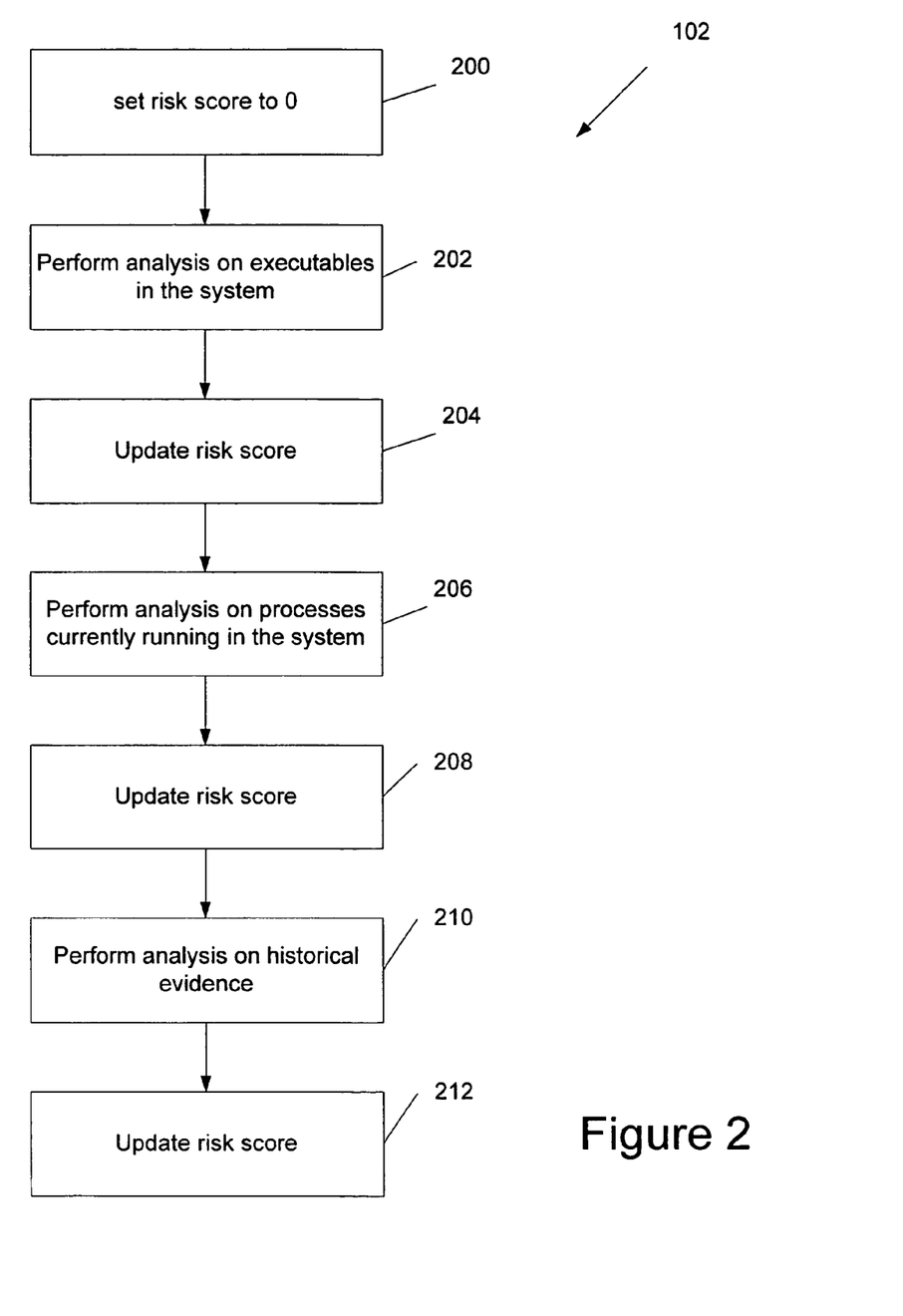
FIG. 2 is a flowchart illustrating the details of static risk analysis (102 of procedure 100) according to some embodiments.

FIG. 2 is a flowchart illustrating the details of static risk analysis (102 of procedure 100) according to some embodiments. In this example, the static risk analysis analyzes the static states of the system, such as configurations and capabilities of the executables and/or currently running processes associated with the executables. The risk profile of an executable includes a risk score used to measure the level of potential risk that will be brought by operating the executable. The higher the risk score, the greater the potential risk the executable brings to the system when it operates. For example, a score of 10 may indicate that an executable is potentially vulnerable to security exploits, while a score of 1 may indicate that an executable is relatively safe. In some embodiments, the executables are classified based on the score. For example, executables with scores of 10 or more may belong to a risky class that requires close monitoring, while executables with scores less than 10 may belong to a less risky class that requires less monitoring. System resource used for monitoring the processes can be efficiently allocated based on the scores.

In this example, the risk scores are set to 0 initially (200). An analysis of executables on the system is then performed (202). During this analysis, an executable is examined to determine whether certain criteria used to gauge the executable's risk level are met. Examples of some of the criteria include whether the executable is configured to run as a service, whether it runs under a highly privileged account, whether it has networking capability, whether it has secure coding violations, etc. Several examples of the criteria used to analyze the executables are discussed in detail below. The risk scores are then updated accordingly (204).

In some embodiments, an additional analysis is optionally performed on the processes that are currently operating on the system (206). The processes are analyzed to further refine the risk level calculations. In some embodiments, a process begins with the same risk score as its corresponding executable. Certain criteria are applied to the processes and the risk scores are adjusted if some of the criteria are met (208). Examples of such criteria include whether the running process has loaded in extra dynamic libraries, whether it owns system objects that do not have sufficient access control, whether it owns networking ports, etc. Several examples of these criteria are also discussed in detail below.

Additional analysis on historical evidence is optionally performed in some embodiments (210). The historical evidence includes various historical activity files that record activities on the system, such as log files, crash dump files, etc. These files may include information not captured previously and can be used to further refine the risk analysis. For example, if an executable does not have a corresponding process that is running during the process analysis, then its risk score obtained at step 208 does not account for risks associated with the process even if the process may exhibit behaviors that would change the risk score. However, aspects of the process may be recorded by a log file, which can be analyzed even after the process has stopped running. In some embodiments, to perform analysis on historical evidence, criteria similar to the ones used in steps 202 and 206 are used. For example, a log file may indicate that a process that is not currently running in the system has a history of elevating its own priority level while running, thus its risk level should be increased. Several examples of the criteria used are discussed in detail below. The risk score is updated accordingly (212).

Static risk analysis procedure 102 includes analyzing executables, currently running processes, and historical evidence in several stages. One or more of the stages may be omitted in some embodiments, and the order of the stages may be different from the example shown. Various criteria are applied during the analysis to evaluate the potential risk levels and profile the risks associated with the executables. In the following specification, examples of criteria used in various stages are discussed. For the purpose of clarification, the criteria shown in the following examples are divided into subcategories such as configuration, capability, etc., although other classifications may be used as well. In some embodiments, the optional dynamic risk analysis procedure (106 of FIG. 1) also involves applying various criteria to the processes. Examples of criteria used in dynamic analysis are also discussed below.

Figure 3:
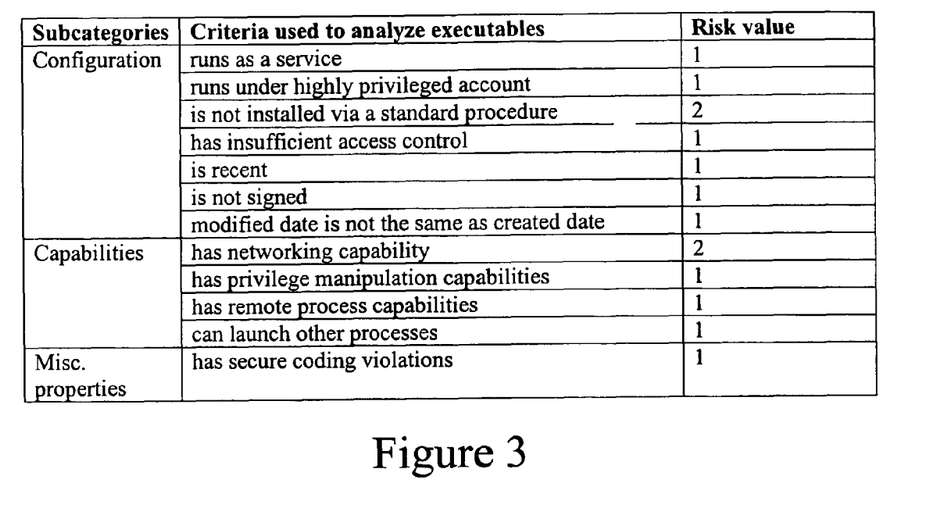
FIG. 3 is a table illustrating several examples of the criteria that are used for analyzing the executables.

FIG. 3 is a table illustrating several examples of the criteria that are used for analyzing the executables (202 of FIG. 2). The criteria are used to identify executables that may be planted by hackers (also referred to as "Trojans") as well as executables that are vulnerable to attacks. In this example, each criterion is associated with a risk value. The risk values may be a part of the IDS's default configuration. They may also be configurable by a user or administrator. Different values may be chosen in some embodiments.

The executable is examined to determine if a certain criterion is met. For example, the configuration of an executable may be checked to determine whether it is configured to run as a service. If so, the risk score of the executable is increased by the risk value associated with the criterion. For example, the risk score may be increased by 1 if the executable is configured to run as a service. In the example shown, the criteria are divided into subcategories of criteria related to the configuration of the executable, criteria related to the capabilities of the executable, as well as criteria related to other miscellaneous properties of the executable.

In this example, one of the subcategories includes criteria related to the configuration of the executable. Examples of this subcategory include:

1. The executable is configured to run as a service. Services such as Windows services and Unix daemons are configured to run most of the time, thus giving hackers more opportunities to exploit them. The determination of whether an executable is configured as a service can be made, for example, by examining the daemon configuration list on Unix and the service control manager on Windows. If it is determined that the executable is configured as a service, the risk score is increased by 1.

2. The executable is configured to run under the context of a highly privileged account such as an administrator or a root account. Such configuration is risky because the hacker may be able to gain access to the process, exploit the process and ultimately gain elevated privileges. The risk value corresponding to this criterion is set to 1 in this example. If the executable is configured to run under a highly privileged account, the risk score is increased by the risk value of 1.

3. The executable is not installed via a standard procedure. If the executable is not installed using the standard installation procedure as a part of the operating system, a regular application, driver, etc., then its existence on the system may be undesirable and poses risk. In some embodiments, an executable is determined to be improperly installed if it is not found in the installation database of the operating system. A risk value of 2 is assigned to this criterion. If the executable is not installed via a standard procedure, the risk score is increased by 2.

4. The executable has insufficient access control, particularly access control at file system level. In some embodiments, an executable is configured to run under a certain user account with a certain privilege level. If another user or process with less privilege than the configured privilege level is able to access and/or manipulate the executable on the file system, the executable is said to have insufficient access control. Not having sufficient access control is particularly undesirable for any executable configured to run under a highly privileged account, since hackers can exploit this weakness to alter the process or masquerade as the process, and eventually exploit the system. The access control of the executable may be determined by, for example, checking an access control list on the file system or any other equivalent mechanism supported by the operating system. A risk value of 1 is assigned to this criterion. If the executable has insufficient access control, its risk score is increased by 1.

5. The executable is recent. An executable is considered recent if it is installed after a certain predetermined date or time frame. Assuming that the system functioned normally in the past and the files installed prior to a certain date or time frame are known to be good, then newer files are potentially risky because they are not tested and may bring harm to the system. A risk value of 1 is assigned to this criterion. If an executable is determined to be recent, its risk score is then increased by 1.

6. The executable is not signed. Signing of a file gives good indication of its source, which is usually legitimate. Unsigned files from an unknown source can be risky. A risk value of 1 is assigned to this criterion. If an executable is determined not to be signed, its risk score is then increased by 1. In some embodiments, it is comparatively easier to identify corrupted binaries if they are signed.

7. The executable's modified date is different from its created date. Sometimes, patches or updates that are later installed may change the modification date but not the created date. In some embodiments, such patches and updates may be excluded from this criterion based on their vendor name, signature, or other identifiers. A risk value of 1 is assigned to this criterion. If an executable has a modified date different from its created date, its risk score is then increased by 1.

Another subcategory of the criteria used to analyze executables includes criteria related to the executable's capabilities. Examples of this subcategory of criteria include:

8. The executable has networking capabilities. Since hackers tend to first target processes that are accessible via the network, processes with networking capability are at greater risk than those without. In some embodiments, to determine whether the executable has networking capabilities, the application programming interface (API) of the executable is examined for networking related calls and functions. Resources such as the global offset table (GOT) on Unix and the import list table (ILT) on Windows may be used to look up networking APIs. A risk value of 2 is assigned to this criterion. If the executable has networking capabilities, its risk score is then increased by 2.

9. The executable has privilege manipulation capabilities. A process that can change its own privilege or the privilege of others is considered risky. In some embodiments, whether an executable has the capabilities can be determined by examining its API for function calls related to changing privilege. A risk value of 1 is assigned to this criterion. If the executable has privilege manipulation capabilities, its risk score is then increased by 1.

10. The executable has remote process capabilities. Remote process capabilities can be determined by, for example, examining the API of the executable and looking up any remote procedure calls (RPCs) in the API. A risk value of 1 is assigned to this criterion. If the executable has remote process capabilities, its risk score is then increased by 1.

11. The executable can launch other process. An executable that can launch other processes is prone to exploits and can be identified by examining its API. A risk value of 1 is assigned to this criterion.

Other criteria related to the properties of the executable form another criteria subcategory. Examples include:

12. The executable has secure coding violations. Secure coding violations refers to poor programming practices that make the executable prone to exploitations, especially exploitations of vulnerabilities resulting from poor coding practices. For example, concatenating strings without defining the buffer boundaries (e.g. using "strcpy" rather than "strncpy") violates secure coding practices and makes the process vulnerable to buffer overflow type of attacks. In some embodiments, the executable binary is profiled to determine whether any secure coding violation exists. A risk value of 1 is assigned to this criterion.

The criteria and risk values shown in this example are for the purposes of illustration only. There are various other applicable criteria that are not enumerated in this example. One or more of the criteria may be used in various embodiments. Different values associated with the criteria may also be used. In some embodiments, the values are configurable by the user. Other methods of computing the risk score or risk level may also be used. For example, in some embodiments, weights instead of values are assigned to the criteria and used to compute the risk level of each executable.

Figure 4:
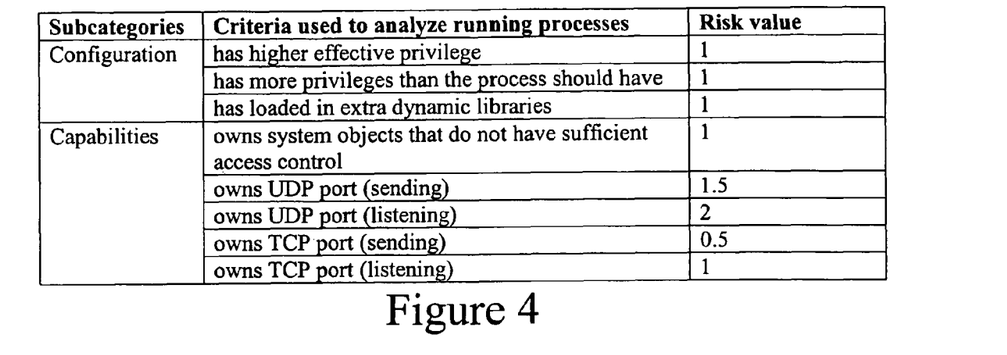
FIG. 4 is a table illustrating several examples of criteria that are used for analyzing the processes.

The risk profiles are further refined by performing a running process analysis (206 of FIG. 2) in some embodiments. The running process analysis includes analyzing the states and properties of the process currently running on the system. While a process is running, its properties may change, and its risk profile may be affected. The risk profile such as the risk level and/or type of the processes may be adjusted in light of the new information provided by the running process analysis. FIG. 4 is a table illustrating several examples of criteria that are used for analyzing the running processes. Similar to the criteria shown in FIG. 3, the criteria shown in this example also have associated risk values. In this example, the criteria are classified into subcategories. Other classification may also be applicable. One of the subcategories includes criteria related to the configuration of the processes. Examples include:

1. The process has a higher run-time privilege than what was determined by the executable analysis. A process may have a higher run-time privilege than what is configured for the executable since some processes are capable of elevating their account privilege or changing account context. Such an elevation also indicates that the process may be risky. A risk value of 1 is assigned to this criterion.

2. The process has more privileges than what the process needs. This may be determined, for example, by determining the highest privilege level used by various APIs of the process and comparing it with the privilege level configured for the process. A risk value of 1 is assigned to this criterion. If the configured privilege level of the process exceeds the highest level needed, the risk score associated with the process is then increased by 1.

3. The process has loaded extra dynamic libraries than indicated by the executable analysis. In some embodiments, the dynamic libraries used by the process are compared with the entries in the IAT or GOT of the executable. If extra libraries such as plug-ins, component object model (COM) or dynamic component object model (DCOM) objects are loaded, then the process may execute code that is not built into the executable and therefore has higher risk. A risk value of 1 is assigned to this criterion. If extra dynamic libraries are loaded by the process, then its risk score is increased by 1.

Another subcategory of criteria includes criteria related to the capabilities of the processes. Examples include:

4. The process owns system objects that are do not have sufficient access control. If another user or process with less privilege than the configured level for the process is able to access or manipulate system objects owned by the process, then these objects do not have sufficient access control. System objects (also referred to as kernel objects or named objects) are objects owned by the system and created or accessed by the process. Mutexes, events, signals, named pipes are several examples of system objects. If a process does not have sufficient access control for its system objects, these objects may be modified by other processes and may increase the vulnerability of the process. A risk value of 1 is assigned to this criterion.

5. The process owns UDP sending ports. A risk value of 1.5 is assigned to this criterion.

6. The process owns UDP receiving ports. A risk value of 2 is assigned to this criterion.

7. The process owns TCP sending ports. A risk value of 0.5 is assigned to this criterion.

8. The process owns TCP receiving ports. A risk value of 1 is assigned to this criterion.

With respect to criteria 5-8, a process that has networking capabilities or owns network ports has risk. In some embodiments, the risk level varies depending on factors such as the type of port, whether the port is a sending port or a receiving port, etc. In this example, UDP ports are deemed to be riskier than TCP ports, and receiving ports are deemed to be riskier than sending ports. In some embodiments, the number of ports may also be taken into account in calculating risk levels.

Historical evidence analysis is optionally used in some embodiments to further refine the risk calculations. Historical evidence refers to records of activities. Crash dump files, system optimization files, log files such as Windows event log files, web server log files, C2 log files, Unix syslog files, wtmp/btmp log files, can be used for historical evidence analysis. The records are analyzed to gather evidence that further qualifies various risk criteria similar to the ones shown in FIGS. 4 and 5.

Several types of records may be used. In some embodiments, process start/stop records are used to understand how processes are created and the relationship among processes. In some embodiments, object access or failure records are used to learn object access patterns, the capabilities as well as limitations of the processes. In some embodiments, user records are used to identify user-process relationships and infer access control settings. In some embodiments, system optimizing files such as swap files, prefetch files for Windows XP platform are analyzed to determine which dynamically linked libraries were loaded, which files were opened and which registry keys were accessed, etc. In some embodiments, crash dump files such as Dr. Watson files, minidump files, dump files and crash files are analyzed. A crash dump file is generated when a process crashes. It captures the states of the process and other relevant information useful for investigating the cause of the crash. Such information can also be used by the IDS to evaluate the various risk criteria.

Once the IDS completes the static risk analysis and determines the risk levels associated with the processes, the initialization phase is completed and the IDS is able to start offering protection to the system. Some IDSs optionally perform dynamic risk analysis (106 of FIG. 1). In some embodiments, the dynamic risk analysis is similar to the running process analysis previously discussed. The IDS continuously monitors the processes that are running in the system and applies dynamic analysis criteria to determine the current risk levels associated with the processes. Newly launched processes that were not active during the initialization phase are examined during the dynamic risk analysis, and updates to the risk levels are made as needed. In some embodiments, access to files, registries, etc. are monitored to infer patterns useful for behavior modeling.

Figure 5:
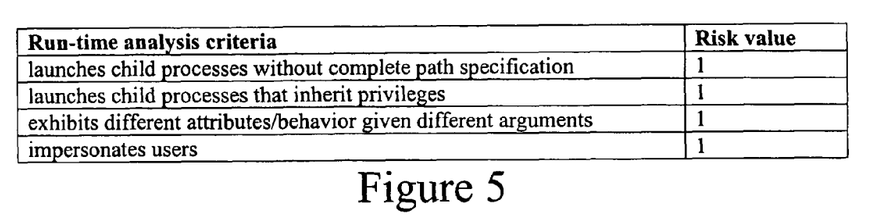
FIG. 5 is a table illustrating several examples of dynamic risk analysis criteria.

In some embodiments, the criteria used for dynamic risk analysis are similar to the ones used to analyze the running processes during static analysis. Other criteria, such as criteria pertaining to aspects of the process that change over time may also be used. FIG. 5 is a table illustrating several examples of criteria used for the dynamic risk analysis, including:

1. The process launches child processes without complete path specification. If a process is launched without full path information, the executable that is launched is likely to depend on the path environment variables. The path environment variables may point to a different copy of the executable that is corrupted. Such a process is at risk of launching Trojan processes and is assigned a risk value of 1 in this example.

2. The process launches child processes that inherit privileges. The child processes may have greater privilege than required, and may use the privileges they inherited to exploit the system. A risk value of 1 is assigned.

3. The process exhibits different attributes/behavior given different arguments. Such a process is considered risky because the behaviors it exhibits based on different arguments may be unknown to the administrator. A risk value of 1 is assigned.

4. The process impersonates users. Such a process may be exploited to acquire administrator privileges, and therefore poses risks to the system. A risk value of 1 is assigned.

The risk analyses reveal security information about binaries and processes in the system. Since the IDS now has in-depth knowledge of the risk associated with the individual binaries and processes, it can more effectively target the specific risks and take appropriate actions when required. Such actions may be based on user input or preconfigured policies. For example, the static risk analysis of an executable configured to run as a service under an administrator account may indicate that the executable does not have networking capabilities. However, during run-time, if it is observed that the executable is attempting to make network connections, the IDS may take appropriate action such as blocking the network activities. In some embodiments, the IDS may also provide the user with feedback indicating that the process is exhibiting risky behavior, and giving the user the option of allowing or disallowing the activity.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing computer security, comprising:
   determining, using at least one computer processor, whether an executable associated with a static state meets one or more first predetermined criteria, the determination not requiring a known executable, other than the executable associated with the static state, or analysis of behavior of the executable and including a determination of at least one of: whether the executable is configured as a service and whether the executable is configured to run under a highly privileged account;
   associating a first risk level with the executable based at least in part upon whether the executable meets the one or more first predetermined criteria;
   determining whether a current process associated with the executable meets one or more second predetermined criteria;
   associating a second risk level with the current process based at least in part upon whether the current process meets the one or more second predetermined criteria, wherein the current process is initially associated with the first risk level, and wherein the first risk level is updated to the second risk level for the current process based at least in part upon whether the current process meets the one or more second predetermined criteria; and
   performing a predetermined responsive action with respect to the process if the second risk level exceeds a threat detection threshold;
   wherein determining whether the executable meets the one or more first predetermined criteria does not comprise comparing the executable with a virus signature.

2. The method for providing computer security as recited in claim 1, wherein the first risk level indicates a level of potential risk that will be brought by operating the executable.

3. The method for providing computer security as recited in claim 1, wherein the first risk level indicates how much risk the executable presents.

4. The method for providing computer security as recited in claim 1, wherein the predetermined criterion includes a configuration criterion.

5. The method for providing computer security as recited in claim 1, wherein the predetermined criterion is used to determine whether the executable is installed via a standard procedure.

6. The method for providing computer security as recited in claim 1, wherein the predetermined criterion is used to determine whether the executable has sufficient access control.

7. The method for providing computer security as recited in claim 1, wherein the predetermined criterion is used to determine whether the executable is modified.

8. The method for providing computer security as recited in claim 1, wherein the predetermined criterion is used to determine whether the executable is signed.

9. The method for providing computer security as recited in claim 1, wherein the predetermined criterion is used to determine whether the executable has a modified date different from created date.

10. The method for providing computer security as recited in claim 1, wherein the predetermined criterion includes a capability criterion.

11. The method for providing computer security as recited in claim 1, wherein the predetermined criterion is used to determine whether the executable has networking capability.

12. The method for providing computer security as recited in claim 1, wherein the predetermined criterion is used to determine whether the executable has privilege manipulation capability.

13. The method for providing computer security as recited in claim 1, wherein the predetermined criterion is used to determine whether the executable has remote process capability.

14. The method for providing computer security as recited in claim 1, wherein the predetermined criterion is used to determine whether the executable has process launching capability.

15. The method for providing computer security as recited in claim 1, wherein the predetermined criterion is used to determine whether the executable has secure coding violation.

16. The method for providing computer security as recited in claim 1, further comprising associating with the executable a risk type indicating a type of risk to which the executable is vulnerable.

17. The method for providing computer security as recited in claim 1, further comprising analyzing historical evidence.

18. The method for providing computer security as recited in claim 1, further comprising analyzing historical evidence, wherein the historical evidence includes a record of activities.

19. The method for providing computer security as recited in claim 1, further comprising analyzing historical evidence, wherein the historical evidence includes a log file.

20. The method for providing computer security as recited in claim 1, further comprising analyzing historical evidence, wherein the historical evidence includes a system optimization file.

21. The method for providing computer security as recited in claim 1, further comprising analyzing historical evidence, wherein the historical evidence includes a crash dump file.

22. The method for providing computer security as recited in claim 1, further comprising analyzing historical evidence, wherein the historical evidence includes a prefetch file.

23. The method for providing computer security as recited in claim 1, further comprising performing a dynamic risk analysis.

24. The method for providing computer security as recited in claim 1, further comprising determining whether the predetermined responsive action is required.

25. A system for providing computer security, comprising:
a processor configured to:
determine whether an executable associated with a static state meets one or more first predetermined criteria, the determination not requiring a known executable, other than the executable associated with the static state, or analysis of behavior of the executable and including a determination of at least one of: whether the executable is configured as a service and whether the executable is configured to run under a highly privileged account;
associate a first risk level with the executable based at least in part upon whether the executable meets the one or more first predetermined criteria;
determine whether a current process associated with the executable meets one or more second predetermined criteria;
associate a second risk level with the current process based at least in part upon whether the current process meets the one or more second predetermined criteria, wherein the current process is initially associated with the first risk level, and wherein the first risk level is updated to the second risk level for the current process based at least in part upon whether the current process meets the one or more second predetermined criteria; and
perform a predetermined responsive action with respect to the process if the second risk level exceeds a threat detection threshold;
wherein determining whether the executable meets the one or more first predetermined criteria does not comprise comparing the executable with a virus signature; and
a memory, coupled with the processor, configured to provide the processor with instructions.

26. A computer program product for providing computer security, the computer program product being embodied in a non-transitory computer readable storage medium and comprising computer instructions for:
determining whether an executable associated with a static state meets one or more first predetermined criteria, the determination not requiring a known executable, other than the executable associated with the static state, or analysis of behavior of the executable and including a determination of at least one of: whether the executable is configured as a service and whether the executable is configured to run under a highly privileged account;
associating a first risk level with the executable based at least in part upon whether the executable meets the one or more first predetermined criteria;
determining whether a current process associated with the executable meets one or more second predetermined criteria;
associating a second risk level with the current process based at least in part upon whether the current process meets the one or more second predetermined criteria, wherein the current process is initially associated with the first risk level, and wherein the first risk level is updated to the second risk level for the current process based at least in part upon whether the current process meets the one or more second predetermined criteria; and
performing a predetermined responsive action with respect to the process if the second risk level exceeds a threat detection threshold;
wherein determining whether the executable meets the one or more first predetermined criteria does not comprise comparing the executable with a virus signature.

* * * * *